Sept. 6, 1960    G. H. HARLAN ET AL    2,951,988
PULSE WIDTH DISCRIMINATOR
Filed Aug. 5, 1957    3 Sheets-Sheet 1

INVENTORS.
JOEL J. GREENBERG
GEORGE H. HARLAN
BY
ATTORNEY
AGENT

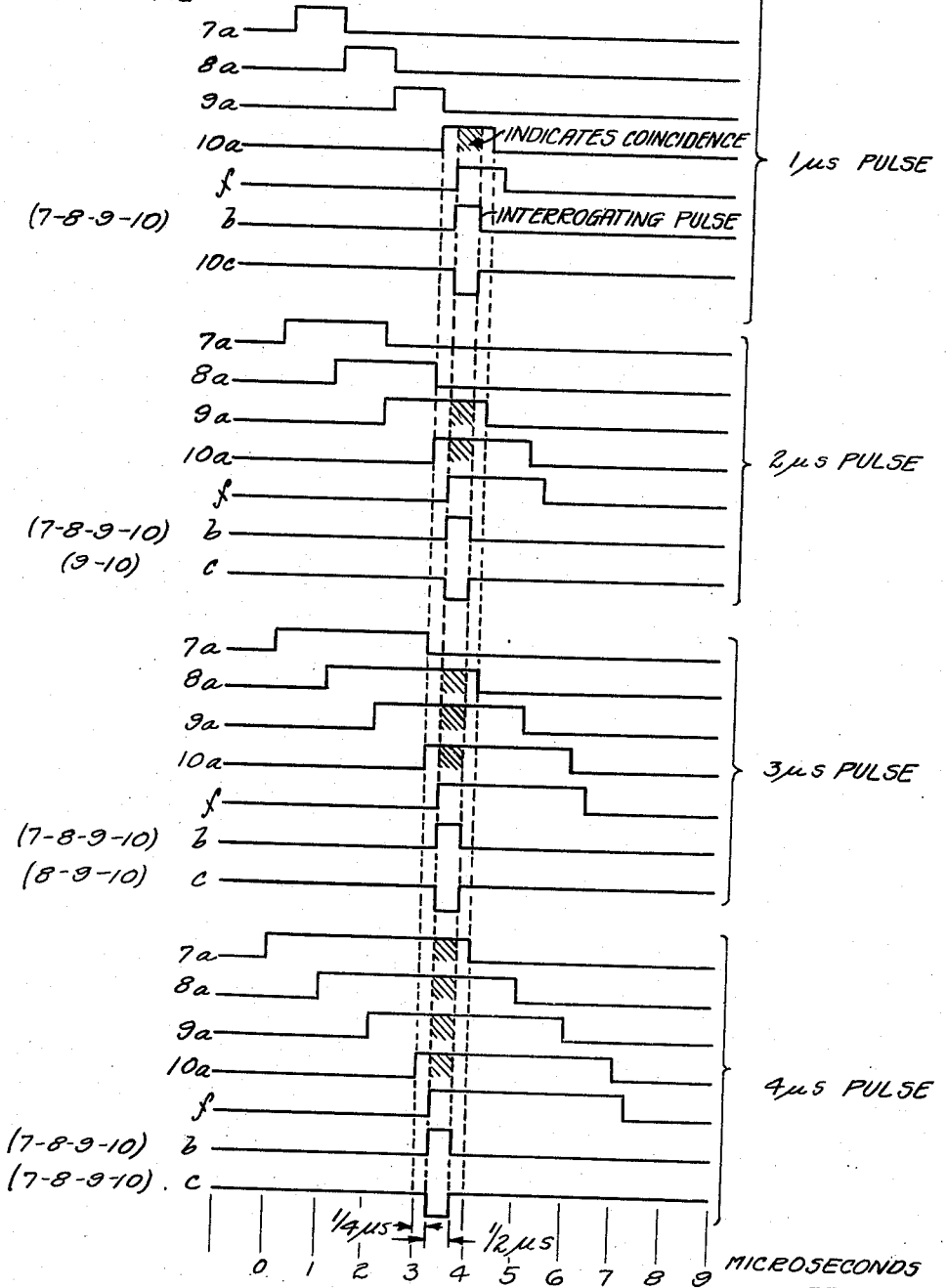

Sept. 6, 1960     G. H. HARLAN ET AL     2,951,988
PULSE WIDTH DISCRIMINATOR
Filed Aug. 5, 1957     3 Sheets-Sheet 3

INVENTORS.
JOEL S. GREENBERG
GEORGE H. HARLAN

യ2,951,988

PULSE WIDTH DISCRIMINATOR

George H. Harlan, Anaheim, Calif., and Joel S. Greenberg, Utica, N.Y., assignors to the United States of America as represented by the Secretary of the Air Force Filed Aug. 5, 1957, Ser. No. 676,446

3 Claims. (Cl. 328—112)

(Granted under Title 35, U.S. Code (1952), sec. 266)

The invention described herein may be manufactured and used by or for the United States Government for governmental purposes without payment to us of any royalty thereon.

The general purpose of this invention is to provide a simple means for discriminating between pulses of different widths or durations and for providing an output indicative of the input pulse width.

More specific objects of the invention are to provide a pulse width discriminator that requires no synchronization; in which the pulses can occur at any repetition rate dependent only on the maximum width of the pulses to be discriminated; in which the repetition rate may be variable; and in which the pulses can occur in any random order. Other objects are to provide a pulse width discriminator circuit that is essentially simple, that is built up from a minimum number of basic circuit elements, and that can be expanded indefinitely by the addition of these elements. An advantage of the circuit is that a fixed known delay exists between each pulse width indicating output and the input to the discriminator.

Figure 1:
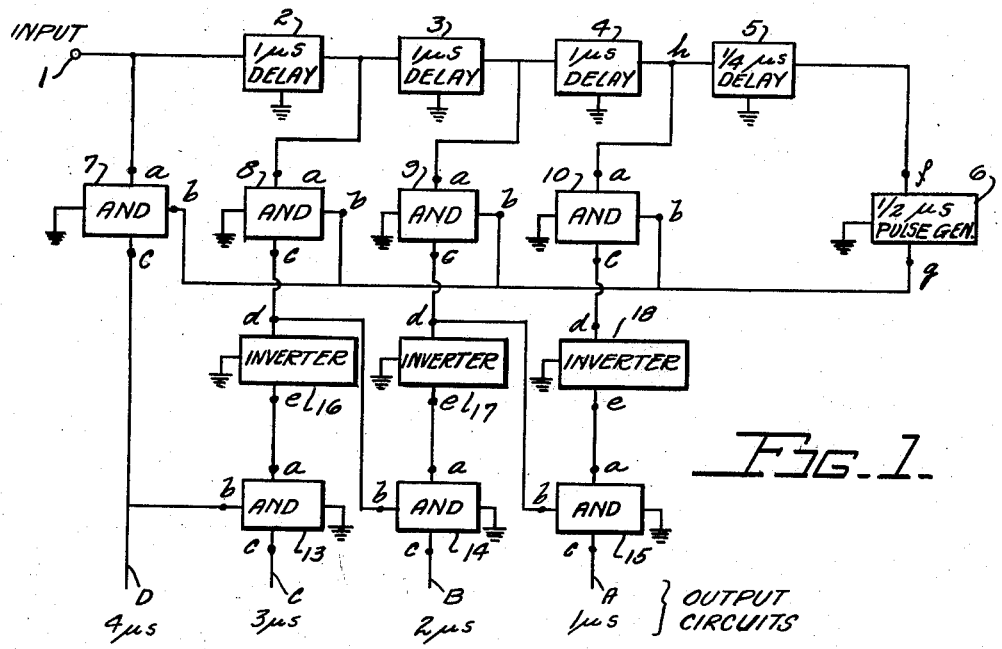
Figure 6:
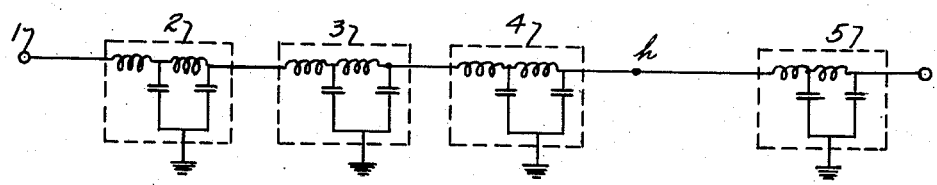
Figure 7:
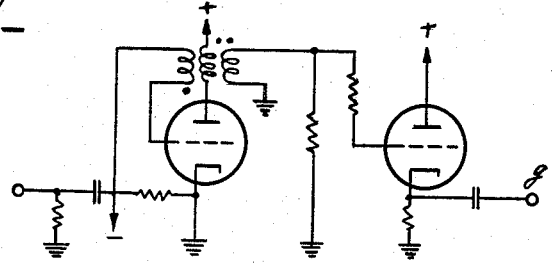
Figure 8:
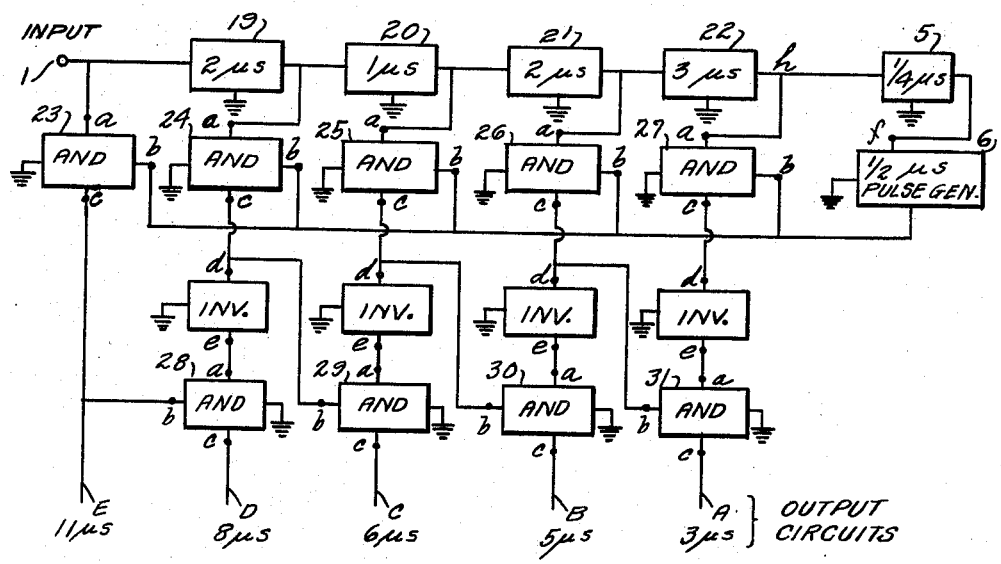
Figure 9:
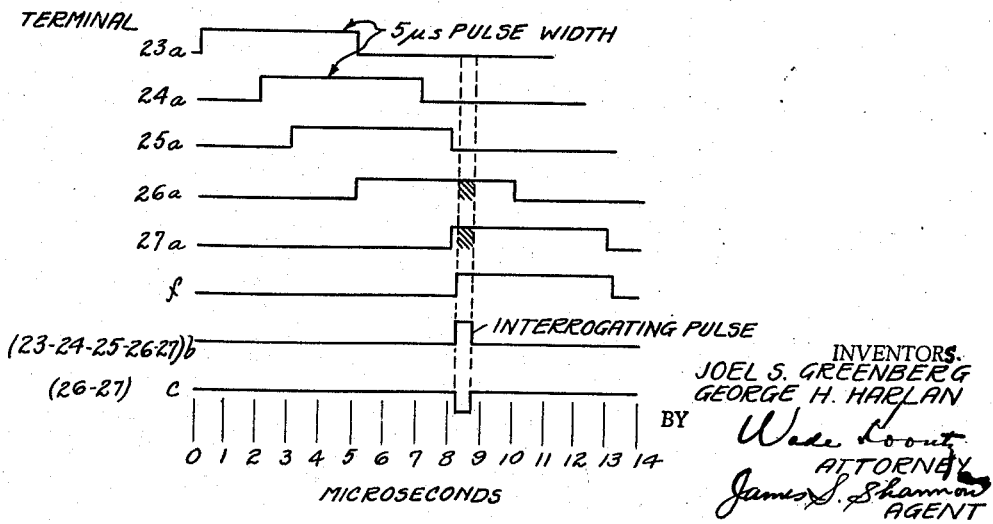

The construction and operation of the circuit will be explained in detail in connection with the specific embodiment thereof shown in the accompanying drawings in which Fig. 1 is a block diagram of the discriminator, Fig. 2 gives waveforms occurring in the discriminator, Figs. 3, 4, 5, 6 and 7 show circuit details of Fig. 1, Fig. 8 is a second embodiment of the discriminator, and Fig. 9 gives waveforms occurring in Fig. 8.

Referring to Figs. 1 and 2, positive pulses to be discriminated as to width are applied in succession to input terminal 1. These pulses may be applied in any random order and at any repetition rate, which may be variable, with the restriction that the spacing between the leading edges of two consecutive pulses must be slightly greater than the maximum pulse width to be discriminated. The circuit shown is designed to discriminate 1, 2, 3 and 4 microsecond pulses. Therefore the minimum repetition interval is 4+ microseconds. From the input terminal the pulses are applied to a delay line having three 1 microsecond delay sections designated 2, 3 and 4 and an output terminal designated $h$. From the output of section 4 the pulses are applied to a ¼ microsecond delay circuit 5 and thence to input terminal $f$ of ½ microsecond pulse generator 6. This generator is triggered by the leading edge of the pulse at $f$ and operates to generate a ½ microsecond positive pulse having a leading edge coincident with the leading edge of the triggering pulse. Therefore, generator 6 produces a ½ microsecond pulse exactly 3¼ microseconds after the leading edge of each pulse at input terminal 1.

Figure 3:
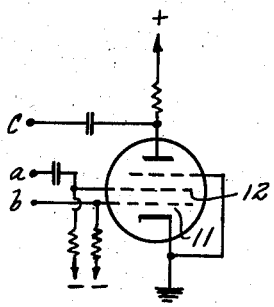

Blocks 7, 8, 9 and 10 represent identical AND gates each having input terminals $a$ and $b$ and an output terminal $c$. Gates of this type are well known in the art, the general definition of an AND gate being a circuit having a plurality of input circuits and an output circuit in which an output will occur only upon simultaneous energization of the input circuits. In the case of gates 7–10, a negative pulse output will be produced at terminal $c$ only when positive pulses are simultaneously applied to terminals $a$ and $b$. A suitable design for these gates is shown in Fig. 3. Grids 11 and 12 are negatively biased to the extent that a positive pulse at $a$ or $b$ alone will not produce conduction in the tube. However, simultaneous positive pulses on $a$ and $b$ cause anode conduction, a resulting drop in anode potential and a negative-going output pulse at $c$.

The positive pulse produced by generator 6 is applied simultaneously to the input terminals $b$ of gates 7–10. The $a$ input terminals of these gates are connected to the delay line so that an input pulse occurs at terminal 10$a$ after a delay of 3 microseconds, at 9$a$ after a delay of 2 microseconds, at 8$a$ after a delay of 1 microsecond and at 7$a$ with no delay. Therefore, if the input pulse has a duration of only 1 microsecond simultaneous energization of input terminals $a$ and $b$ will occur only in the case of gate 10 since the trailing edge of this pulse will have left terminals 7$a$, 8$a$ and 9$a$ when the generator 6 pulse occurs. For a 2 microsecond pulse, however, both 9$a$ and 10$a$ are energized when the ½ microsecond pulse of generator 6 is produced, and for 3 and 4 microsecond pulses, terminals 10$a$—9$a$—8$a$ and 10$a$—9$a$—8$a$—7$a$, respectively, are energized when the ½ microsecond pulse occurs on the corresponding $b$ input terminals. Consequently, a 1 microsecond pulse produces a negative pulse at terminal 10$c$, a 2 microsecond pulse produces negative pulses at terminals 10$c$ and 9$c$, a 3 microsecond pulse produces negative pulses at terminals 10$c$, 9$c$ and 8$c$, and a 4 microsecond pulse produces negative output pulses at output terminals $c$ of all four AND gates. This is illustrated in Fig. 2 which shows the conditions in the circuit at the time the ½ microsecond pulse of generator 6 is produced for input pulse widths of 1, 2, 3 and 4 microseconds. Since the pulse produced by generator 6 in effect interrogates, through gates 7–10, the line to determine which points on the line have pulse potentials thereon at the time, it may be referred to as an interrogating pulse.

Figure 4:
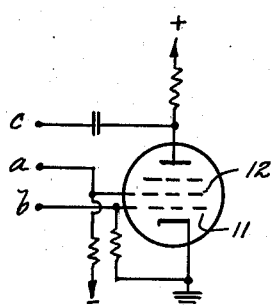
Figure 5:
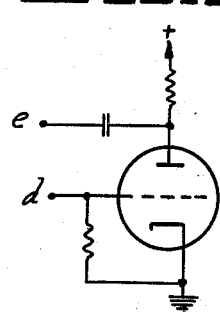

Three additional AND gates, numbered 13, 14 and 15, are provided to analyze the outputs of AND gates 7–10 and to energize one of the four output circuits A, B, C and D in accordance with whether outputs occur from one, two, three or four of the gates 7–10. AND gates 13–15 are identical to AND gates 7–10, simultaneous positive potentials on input terminals $a$ and $b$ being required to produce a negative output at terminal $c$. However, as seen in Fig. 4, in gates 13–15 the grid connected to terminal $b$ is returned to the cathode rather than being negatively biased as in gates 7–10 (Fig. 3). Therefore, in effect, terminal $b$ has a continuously applied positive input so that a positive input pulse on terminal $a$ only is required to produce a negative output pulse at terminal $c$. However, if a negative pulse is applied to terminal $b$ at the time a positive pulse is applied to terminal $a$, the negative output at terminal $c$ will be prevented or inhibited. The negative output pulses at terminals $c$ of gates 8, 9 and 10 are applied to input terminals $a$ of gates 13, 14 and 15, respectively, through polarity inverters 16, 17 and 18, which may be single electron tube stages as in Fig. 5, so that they appear as positive pulses on these terminals. As seen in the drawing, the input terminals $b$ of gates 13, 14 and 15 are connected to the terminals $c$ of gates 7, 8 and 9, respectively, so that the negative outputs of these gates, if any, will inhibit the operation of the associated gates 13–15.

When the input pulse has a width of 1 microsecond there will be a negative output at terminal 10c but none at terminals 9c, 8c and 7c as already explained. Therefore, only gate 15 will have positive inputs on both terminals a and b and a negative output pulse on terminal c. Hence an output pulse at terminal 15c, or output circuit A, indicates a 1 microsecond pulse.

For a 2 microsecond pulse, there will be negative pulse outputs at terminals 10c and 9c but none at terminals 8c and 7c. Gate 15 will have a positive pulse at terminal a but a negative pulse at terminal b derived from terminal 9c, and therefore no output. Gate 13 will have no input at terminal a and therefore no output at terminal c and gate 7 will have no input at terminal a and therefore no output at terminal c. Therefore, for a 2 microsecond pulse, terminal 14c and output circuit B only will be energized. Similarly, for a 3 microsecond pulse, the negative outputs at 8c and 9c inhibit gates 14 and 15, whereas the absence of an input at 7a precludes an output at 7c, so that only output circuit C, connected to terminal 13c, is energized. Finally, for a 4 microsecond pulse, negative pulse outputs at terminals 7c, 8c and 9c inhibit gates 13, 14 and 15, preventing outputs to circuits A, B and C so that output circuit D only is energized.

The delay line employed may be of any design supplying the delays and taps shown. A suitable line is illustrated in Fig. 6. Also pulse generator 6 may be of any known type capable of being triggered by the wavefront applied to terminal f and of generating a positive pulse at terminal g having the required duration and a leading edge coincident with the triggering wavefront. A pulse generator of the blocking oscillator type and having a cathode follower output is illustrated in Fig. 7. The operation of circuits of this type is well understood in the art and need not be explained in detail.

In the foregoing example all of the pulses to be discriminated were consecutive multiples of the pulse of shortest duration, which was 1 microsecond. Such an arrangement is, of course, not necessary, it being permissible that the pulses to be discriminated have any widths desired. For example, assume it is desired to discriminate pulse widths of 3, 5, 6, 8 and 11 microseconds. A circuit for accomplishing this is shown in Fig. 8. The delay line has four sections numbered 19-22. AND gates 23-27 are identical to AND gates 7-10 of Fig. 1, and AND gates 28-31 are identical to AND gates 13-15 of Fig. 1, the number of gates provided being the number required to supply the five output circuits A, B, C, D and E. The operation of Fig. 8 is believed to be obvious after the above detailed explanation of Fig. 1. Briefly, for a 3-microsecond pulse, only gate 27 has a positive potential on terminal a when the positive pulse from generator 6 is applied to terminal b, and therefore only this gate has an output. Thus, only output circuit A is energized for a 3 microsecond pulse. For a 5 microsecond pulse, terminals 27a and 26a have positive potentials when the output of generator 6 occurs, however, the resulting negative pulse at 26c inhibits gate 31 so that only output circuit B is energized. Similarly, a 6 microsecond pulse energizes only circuit C, gates 31 and 30 being inhibited; an 8 microsecond pulse energizes only circuit D, gates 31, 30 and 29 being inhibited; and an 11 microsecond pulse energizes only circuit E, gates 31, 30, 29 and 28 being inhibited. The waveforms for the 5 microsecond case are shown in Fig. 9.

The general rules for designing a pulse width discriminating circuit for any number of pulse widths having any desired values are apparent from Fig. 8 and may be stated as follows:

(1) The delay line has (n—1) sections where n is the number of pulse widths to be discriminated.

(2) The last section of the line has a delay equal to the smallest pulse width to be discriminated; the next to the last section has a delay such that when added to the delay of the last section the sum equals the next longer pulse width to be discriminated; the third section from the end of the line has a delay such that when added to the last two sections the sum equals the next longer pulse width to be discriminated; and so on until the first section of the line has a delay such that when added to the delays of the remaining sections the sum equals the next to longest pulse width to be discriminated.

(3) The arrangement of AND gates, inhibiting AND gates, inverters and output circuits is the same in all cases, the scheme merely being expanded or contracted as required to accommodate the number of pulse widths being discriminated.

(4) The delay produced by element 5 should be small compared to the least delay produced by a section of the delay line.

(5) The duration or width of the interrogating pulse produced by generator 6 should not exceed the difference between the least delay produced by a line section and the delay produced by element 5.

It is therefore seen that n points, corresponding to the n widths to be discriminated, are established on the line. These points are the input terminal 1, the points located between adjacent delay sections and the output terminal h. There are also provided n output circuits each corresponding to one of the established points on the delay line. A short time (¼ microsecond in the examples given) after the leading edge of a pulse appears at output terminal h, the line is interrogated, by means of the pulse produced by generator 6 and the AND gates connected to the line, to determine which of the established points has pulse potential thereon at that time. The inhibiting AND gates, which control the energization of all output circuits except the circuit for the widest pulse, then operate to energize only the output circuit corresponding to the established line point satisfying the two conditions (1) that there be pulse potential thereon and (2) that there be no other line point of lesser delay with pulse potential thereon.

We claim:

1. An electric pulse width discriminator comprising: a delay line having an input terminal, an output terminal and (n—1) cascaded sections, where n is the number of different pulse widths to be discriminated, whereby n delay line points are established, said points being said input terminal, the points between adjacent line sections and said output terminal, and in which each section has a delay such that when added to the delay existing between said section and the output terminal the sum equals one of the pulse widths to be discriminated with the exception of the greatest pulse width; means connected to said delay line points and operative shortly after the appearance of the leading edge of a pulse at said output terminal for determining which of said n delay line points have pulse potentials thereon at that time; n output circuits each corresponding to one of said n line points; and means connected with said output circuits and the first mentioned means for energizing at any one time only the output circuit correspoding to the line point satisfying the conditions that there be pulse potential thereon and that there be no other line point of lesser delay with pulse potential thereon.

2. An electric pulse width discriminator comprising: a delay line having an input terminal, an output terminal and (n—1) cascaded sections, where n is the number of different pulse widths to be discriminated, whereby n delay line points are established, said points being said input terminal, the points between adjacent sections and said output terminal, and in which each section has a delay such that when added to the delay existing between said section and the output terminal the sum equals one of the pulse widths to be discriminated with the exception of the greatest pulse width; an electric pulse generator having a triggering circuit and operative when triggered to generate a single short interrogating pulse; a coupling between the output terminal of said delay line and said triggering circuit, said coupling containing means producing a delay less than the smallest delay produced by a section of said line; $n$ identical AND gates each having two input terminals and an output terminal; a coupling between said pulse generator and one of the input terminals of each AND gate for applying said interrogating pulse simultaneously to said AND gates; means connecting the other input terminal of each AND gate to one of said $n$ points on said delay line; $n$ output circuits; a coupling between each output circuit and the output terminal of one of said AND gates; and means located in each of the last named couplings, except that associated with the AND gate connected to said delay line input terminal, and connected to the output terminal of the AND gate connected to the line point of next lesser delay relative to the line point to which the AND gate associated with the particular coupling is connected, for inhibiting the energization of the associated output circuit whenever there is an output from the AND gate connected to the said point of next lesser delay.

3. Apparatus as claimed in claim 2 in which the width of said interrogating pulse does not exceed the difference between the delay introduced betwen the said output terminal and triggering circuit and the smallest delay produced by a line section.

References Cited in the file of this patent

UNITED STATES PATENTS

| | | |
|---|---|---|
| 2,369,662 | Deloraine et al. | Feb. 20, 1945 |
| 2,409,689 | Morton et al. | Oct. 22, 1946 |
| 2,516,888 | Levy | Aug. 1, 1950 |
| 2,554,112 | Libois | May 22, 1951 |
| 2,592,308 | Meacham | Apr. 8, 1952 |
| 2,635,229 | Gloess et al. | Apr. 14, 1953 |
| 2,670,463 | Raymond et al. | Feb. 23, 1954 |
| 2,752,507 | Dureau | June 26, 1956 |
| 2,817,771 | Barnothy | Dec. 24, 1957 |